United States Patent [19]

Hattori

[11] 4,351,563
[45] Sep. 28, 1982

[54] HEADREST FOR VEHICLES
[75] Inventor: Takemi Hattori, Kariya, Japan
[73] Assignee: Aisin Seiki Kabushiki Kaisha, Kariya, Japan
[21] Appl. No.: 179,725
[22] Filed: Aug. 20, 1980
[30] Foreign Application Priority Data
   Sep. 5, 1979 [JP] Japan .............................. 54/113955
[51] Int. Cl.³ .............................................. A47C 1/02
[52] U.S. Cl. ..................................... 297/408; 248/118; 297/391
[58] Field of Search ................. 297/408, 409, 391, 61; 248/118
[56] References Cited
   U.S. PATENT DOCUMENTS
   1,957,608  5/1934  McCann ............................. 297/409
   2,087,152  7/1937  Johnson ............................. 297/409
   4,256,341  3/1981  Goldner ........................... 297/408 X FOREIGN PATENT DOCUMENTS
   1945571 12/1977 Fed. Rep. of Germany ...... 297/408
   2720629 11/1978 Fed. Rep. of Germany ...... 297/408
   2525013 12/1978 Fed. Rep. of Germany ...... 297/408
   1537551 12/1978 United Kingdom ............... 297/408

Primary Examiner—James T. McCall
Attorney, Agent, or Firm—Oblon, Fisher, Spivak, McClelland & Maier

[57] ABSTRACT

A headrest for vehicles which includes a stay, a bracket fixed to the headrest, a fixed link pivotally supported by the stay at one end thereof and pivotally supporting the bracket at other end thereof, an elongated hole provided in the bracket so as to guide the stay and to move the bracket, a pawl lever provided with a pawl portion, and a latch hole provided on the bracket whereby the inclination of the bracket is regulated by engaging the pawl portion of the pawl lever with the latch hole.

5 Claims, 3 Drawing Figures

HEADREST FOR VEHICLES

BACKGROUND OF THE INVENTION

1. Field of the Invention

The present invention relates to a headrest, and more particularly to a headrest for vehicles.

2. Description of the Prior Art

In a conventional headrest for vehicles a regulating mechanism for forwardly and rearwardly moving a headrest or inclining the same is provided and includes a linkage or a guide mechanism and a locking mechanism so that the width of the headrest is obliged to be large and these mechanisms can not be installed in a backrest for a middle-sized car and a small-sized car.

SUMMARY OF THE INVENTION

An object of the present invention is to provide an improved headrest for vehicles which obviates the aforementioned drawbacks of the described conventional headrest.

A further object of the present invention is to provide an improved headrest for vehicles which can be reliably moved and inclined.

A still further object of this invention is to provide an improved headrest for vehicles which is relatively simple and includes a minimum number of parts.

BRIEF DESCRIPTION OF THE DRAWINGS

Various other features, objects and attendant advantages of the present invention will become self-evident when considered in connection with the accompanying drawings wherein.

DETAILED DESCRIPTION OF THE PREFERRED EMBODIMENT

Figure 1:
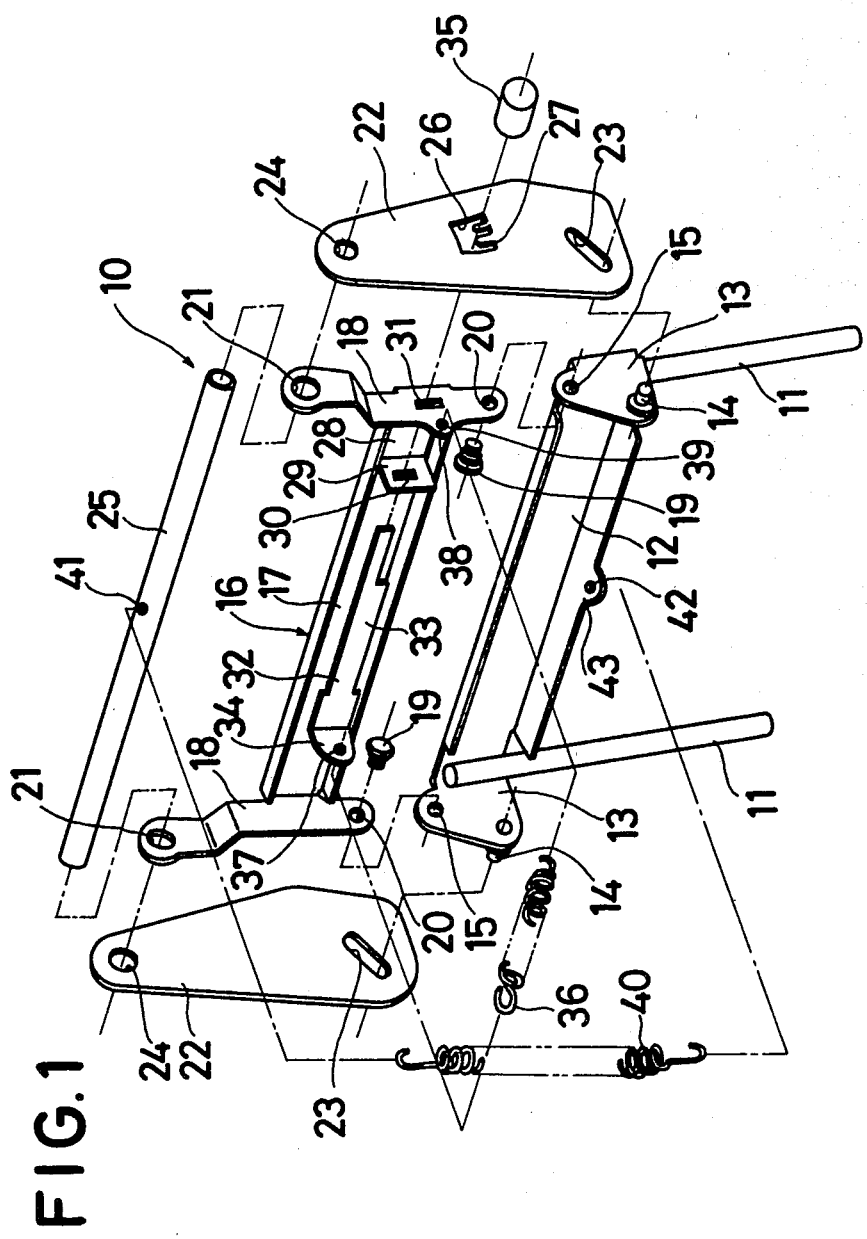
FIG. 1 is a disassembled view which shows a preferred embodiment of a headrest for vehicles according to the present invention.
Figure 2:
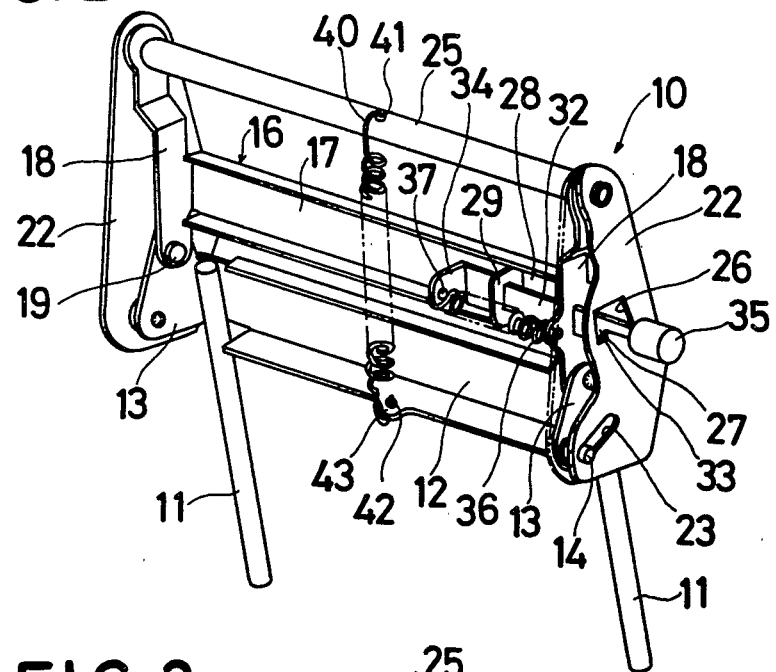
FIG. 2 is a view which shows the assembled state of the headrest of FIG. 1 and including a regulating mechanism into FIG. 1.

Referring now to FIGS. 1 and 2, reference numeral 10 denotes a headrest for vehicles, and reference numerals 11, 11 denote stays which are upwardly and downwardly movable within a seat backrest (not shown) for adjusting the height of the headrest 10. Respective ends of stays 11, 11 are inserted into the seat backrest (not shown) and respective opposite ends thereof are fixedly attached to both ends of fixed lever 12.

Flange portions 13, 13 are mounted on both ends of fixed lever 12. Pins 14,14 are fixed to respective ends of the flange portions 13, 13 and holes 15, 15 are provided on respective opposite ends thereof. A reinforcing link member 16 includes a reinforcing portion 17 at the central portion thereof and link portions 18,18 at both ends thereof. Pins 19,19 are inserted into holes 20,20 provided on respective ends of the link portions 18,18 of reinforcing link member 16 and also into the holes 15,15 of flange portions 13,13 of fixed lever 12, so that reinforcing link member 16 is rotatable around the pins 19,19. Holes 21,21 are provided on respective opposite ends of the link portions 18,18 of the reinforcing link member 16.

Reference numerals 22,22 denote side brackets and inclined elongated holes 23,23 are provided on respective ends thereof for allowing the insertion of the pins 14,14 fixed on the flange portions 13,13 of the fixed lever 12 and holes 24,24 are provided on respective opposite ends of the side brackets 22,22 for fixing both ends of the shaft 25. A latch hole or recessed portion 26 is formed on the central portion of one side bracket 22 and is provided with a plurality of recessed portions 27. Respective opposite ends of the link portions 18,18 of the reinforcing link member 16 are rotatable around the shaft 25.

A guide link 28 is fixed to one link portion 18 of the reinforcing link member 16 and is extended into the reinforcing member 17 and a flange portion 29 is provided with an angled hole 30 at an inner end of the guide link 28. Angled hole 31 is formed on one link portion 18 of the reinforcing link member 16 and also at the portion of the link portion 18 corresponding to the angled portion 30 of the guide link 28.

Reference numeral 32 denotes a pawl lever disposed within the reinforcing portion 17 of the reinforcing link member 16. Pawl lever 32 includes a pawl portion 33 at one end thereof and a flange portion 34 at the other end thereof. Pawl portion 34 of the pawl lever 32 is engageable with one of the recessed portion 27 of latch hole 26 by penetrating the angled portion 30 of the guide link 28 and also the angled hole 31 of one link portion 18 of the reinforcing member 16. An operating knob 35 is fixed to one end of the pawl portion 33 of the pawl lever 32.

Reference numeral 36 indicates a spring of which one end is engaged with a hole 37 provided in the flange portion 34 of the pawl lever 32 and other end thereof is engaged with a hole 38 of a projecting portion 39 formed in one link portion 18 of the reinforcing link member 16. Pawl portion 33 of the pawl lever 32 is continuously urged by the spring 36 so as to engage one portion of recessed portion 26 of the latch hole 27 of side bracket 22. Reference numeral 40 indicates a spring of which one end is engaged with a hole 41 provided in a central portion of shaft 25 and the other end thereof is engaged with a hole 42 in a projecting portion 43 provided in a central portion of the fixed lever 12. Spring 40 continuously urges the reinforcing link member 16 so as to forwardly bias the side brackets 22,22 and to forwardly incline the reinforcing link member 16 around the pin 19,19 through shaft 25.

Figure 3:
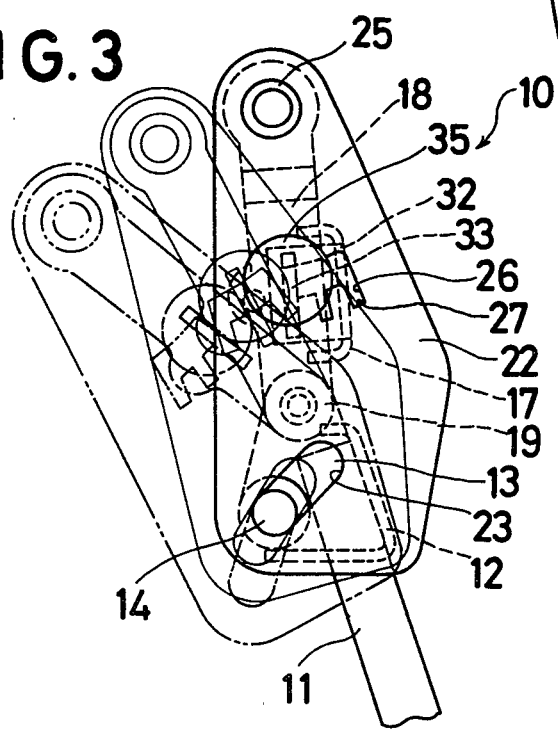
FIG. 3 is a view of the stages of actuating of the present invention.

The operation according to the invention is as follows:

A solid line in FIG. 3 shows a state in which the headrest 10 is perpendicularly located against the seat backrest (not shown), however, in the case where an occupant wants to forwardly move and incline the headrest 10 from the solid line in FIG. 3, knob 35 is pressed in the inward direction of the reinforcing portion 17 of the reinforcing link member 16 against the biasing force of the spring 36. Accordingly, pawl portion 33 of the pawl lever 32 is disengaged from the recessed portion 27 of latch hole 26, and reinforcing link member 16 is forwardly (in a counter-clockwise direction) inclined around pins 19,19 through shaft 25 by the biasing force of the spring 40 and is also moved forwardly along pins 14,14 inserted into elongated holes 23,23 of brackets 22,22. At this time, if the occupant concludes that the headrest 10 is in a desired forwardly inclined position, the pressing force on the knob 35 is released. In this case, the pawl portion 33 of the pawl lever 32 is engaged with the recessed portion 27 of the latch hole 26 of one side bracket 22, thereby obtaining the desired forwardly inclined position of the headrest 10.

In the case where the occupant wants to return the headrest 10 from the state of the chain and dotted line to the state of the solid line, knob 35 is pressed in the inward direction of the reinforcing portion 17 of the reinforcing link member 16 against the biasing force of spring 36. Accordingly, the pawl portion 33 of pawl lever 32 is disengaged from recessed portion 27 of latch hole 26. Although the reinforcing link member 16 tends to forwardly (in a counter-clockwise direction) incline around the pins 19,19 through the shaft 25 by the urging force of the spring 40, the pressing force is manually or by the head portion of the occupant acting against the headrest 10. The side bracket 22 is thereby rearwardly moved along pin 14,14 inserted into the elongated hole 23 while the reinforcing link member 16 is rearwardly (in a clockwise direction) inclined around pins 19,19 through shaft 25 by the biasing force of spring 40. At this time, if the occupant releases the pressing force on knob 35, pawl portion 33 of the pawl lever 32 is engaged with the recessed portion 27 of the latch hole 26 of one side bracket 22 by the biasing force of spring 36, thereby obtaining the desired vertical portion of the headrest 10.

By the foregoing, there has been disclosed a preferred form of headrest for vehicles constructed in accordance with the present invention. It will be appreciated that various additions, substitutions, modifications and omissions may be made thereto without departing from the spirit of the invention.

What is claimed as new and desired to be secured by Letters Patent of the United States is:

1. A headrest for vehicles having a seat backrest comprising:
   a stay fixed to said seat backrest and including a projecting portion,
   a bracket member fixed to said headrest, and including an elongated hole formed therein,
   a link member pivotally supported by said stay at one end thereof and pivotally supporting said bracket member at an opposite end thereof,
   said elongated hole provided in said bracket member serving to guide said projecting portion to move said bracket member,
   regulating means disposed between said link member and said bracket member for regulating the inclination of said bracket member,
   a reinforcing link member rotatably supported by said bracket member and including a reinforcing portion,
   and
   a guide link portion pivotally supported by said stay at one end thereof and pivotally supporting said bracket member at the opposite side thereof.

2. A headrest for vehicles as set forth in claim 1, wherein said regulating means includes a pawl lever and a latch hole provided in said bracket member.

3. A headrest for vehicles as set forth in claim 2, wherein said latch hole includes a plurality of recessed portions which are engageable with said pawl lever.

4. A headrest for vehicles as set forth in claim 3 further comprising spring means biasing said pawl lever so as to engage one of said recessed portions of said latch hole.

5. A headrest for vehicles as set forth in claim 1 further comprising spring means biasing said reinforcing link member so as to forwardly move said bracket member and to forwardly incline said reinforcing link member.

* * * * *